Patented Jan. 25, 1927.

1,615,515

UNITED STATES PATENT OFFICE.

JOHANN EDUARD MARWEDEL AND JOSEPH LOOSER, OF HONNINGEN-ON-THE-RHINE, GERMANY, ASSIGNORS TO RHENANIA VEREIN CHEMISCHER FABRIKEN A.-G., OF AACHEN, GERMANY, A CORPORATION OF GERMANY.

PROCESS FOR MAKING BARIUM CARBONATE.

No Drawing. Application filed October 21, 1922, Serial No. 596,104, and in Germany January 4, 1922.

In the production of barium carbonate from barium sulphate (heavy spar) by heating with coal, lixiviating of the thereby obtained product, and passing of carbon dioxide into the barium sulphide solution, the barium carbonate, which precipitates as a white deposit, contains always sulphur as an impurity for instance barium thiosulphate and barium sulphide which partly adhere so strongly to the deposit, that they cannot be removed even by repeated washing with hot water. Owing to the presence of sulphur the barium carbonate is for many purposes unsatisfactory.

According to the present invention barium carbonate, which has only a very small percentage of sulphur as an impurity, is produced by carrying out the precipitation of the carbonate in the presence of alkali-metal carbonates added to the barium sulphide solution before or during the admission of the carbon dioxide. The precipitated barium carbonate is separated from the solution and lixiviated with water.

Example: To a solution containing 100 kilograms of barium sulphide 30 kilograms of alkali-metal carbonate are added and the mixture is saturated with carbon dioxide. The precipitated barium carbonate contains only 0,70% of sulphur compounds (calculated as $BaSO_4$). The same barium sulphide solution to which no alkali metal carbonate has been added produced in a parallel experiment barium carbonate with 2,16% of sulphur compounds (calculated as $BaSO_4$).

Another form of application of the invention giving even better results consists in admixing barium carbonate, precipitated in presence of alkali-metal carbonate, preferably at the moist state with alkali-metal hydroxide, which can be partly replaced by alkali-metal carbonates, and in heating the mixture.

By the precipitation of the barium carbonate in the presence of alkali-metal carbonate the principal quantity of the sulphur compounds is eliminated and by continuing then to heat the separated barium carbonate, which is poor in sulphur, with alkali-metal hydroxide or with alkali-metal hydroxide and alkali-metal carbonate a final product is obtained which is practically free from sulphur.

The heating of the mixture can be done for instance in a drying kiln, in a drying drum or in the autoclave. If the heating is done in the autoclave temperatures of for instance 120 to 200° C. have proved advantageous. In all cases products are obtained which, after lixiviation with water and drying, are indifferent to silver and come up to the highest exigencies of the industry. The quantity of the alkali-metal hydroxide or of the alkali-metal carbonate to be added depends on the percentage of sulphur of the barium carbonate and on the desired degree of purity of the final product. The degree of temperature is also of importance; if higher temperatures are used for instance less alkali-metal hydroxide or less alkali-metal carbonate will be required.

By the heating of the still impure barium carbonate in mixture with alkali-metal hydroxide or alkali-metal hydroxide and alkali-metal carbonate the sulphur of the impurities is bound by these alkali-metal compounds, thereby producing easily soluble alkali-metal sulphur compounds, which are removed by lixiviation with water.

We claim:

1. A process for the production of barium carbonate consisting in treating barium sulphide solution in the presence of alkali-metal carbonate with carbon dioxide, in separating the precipitated barium carbonate from the solution and in lixiviating the separated product.

2. A process for the production of barium carbonate consisting in treating barium sulphide solution in the presence of sodium carbonate with carbon dioxide, in separating the precipitated barium carbonate from the solution and in lixiviating the separated product.

3. A process for the production of barium carbonate consisting in treating barium sulphide solution in the presence of alkali-metal carbonate with carbon dioxide, in heating the precipitated barium carbonate, after separation from the solution, in the presence of alkali-metal hydroxide and in lixiviating the product.

4. A process for the production of barium carbonate consisting in treating barium sulphide solution in the presence of alkali-metal carbonate with carbon dioxide, in heating the precipitated barium carbonate, after separation from the solution, in the presence of alkali-metal hydroxide and alkali-metal carbonate and in lixiviating the product.

In testimony whereof we affix our signatures.

JOHANN EDUARD MARWEDEL.
JOSEPH LOOSER.